United States Patent
Hu et al.

(10) Patent No.: US 11,330,339 B2
(45) Date of Patent: May 10, 2022

(54) METHOD AND SYSTEM TO DYNAMICALLY CONFIGURE SUBTITLES THROUGH WEARABLE DEVICES

(71) Applicant: ARRIS Enterprises LLC, Suwanee, GA (US)

(72) Inventors: Fenggen Hu, Shanghai (CN); Libo Sheng, Shanghai (CN); Jianguo Zhou, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/551,477

(22) PCT Filed: Dec. 19, 2016

(86) PCT No.: PCT/CN2016/110857
§ 371 (c)(1),
(2) Date: Aug. 16, 2017

(87) PCT Pub. No.: WO2018/112714
PCT Pub. Date: Jun. 28, 2018

(65) Prior Publication Data
US 2019/0320237 A1    Oct. 17, 2019

(51) Int. Cl.
*H04N 21/488* (2011.01)
*G06F 1/16* (2006.01)
(Continued)

(52) U.S. Cl.
CPC ........ *H04N 21/4884* (2013.01); *G06F 1/163* (2013.01); *H04N 21/4122* (2013.01); *H04N 21/44227* (2013.01); *H04N 21/4516* (2013.01)

(58) Field of Classification Search
CPC .......... H04N 21/4884; H04N 21/4516; H04N 21/44227; H04N 21/4122; H04N 21/485; G06F 1/163
See application file for complete search history.

(56) References Cited

U.S. PATENT DOCUMENTS

| 7,584,280 B2 | 9/2009 | Kim et al. |
| 8,924,999 B1 | 12/2014 | Santangelo et al. |

(Continued)

FOREIGN PATENT DOCUMENTS

| CN | 104363520 A | 2/2015 |
| CN | 105260026 A | 1/2016 |
| CN | 105321330 A | 2/2016 |

OTHER PUBLICATIONS

PCT International Search Report & Written Opinion, RE: Application No. PCT/CN2016/110857, dated Aug. 30, 2017.

(Continued)

*Primary Examiner* — Kunal Langhnoja
(74) *Attorney, Agent, or Firm* — Wenderoth, Lind & Ponack, L.L.P.

(57) ABSTRACT

A method, system and non-transitory computer readable media for dynamically configuring device settings. The equipment device (e.g., set-to box, TV or the like) stores in a memory a plurality of settings profiles, wherein each settings profile is a structured data set related to a wearable computing device including at least a device identifier associated with the related wearable computing device and one or more device settings. The equipment device detects a wearable computing device, wherein detecting the wearable computing device includes identifying a specific device identifier associated with the detected wearable computing device. A querying module of the equipment device executes a query on the memory to identify a specific settings profile where the included device identifier corresponds to the specific device identifier. The equipment device adjusts the device settings based on the one or more device settings included in the identified specific settings profile.

17 Claims, 4 Drawing Sheets

(51) Int. Cl.
    *H04N 21/41*     (2011.01)
    *H04N 21/442*    (2011.01)
    *H04N 21/45*     (2011.01)

(56) References Cited

U.S. PATENT DOCUMENTS

| | | | |
|---|---|---|---|
| 10,334,303 B1* | 6/2019 | Chung | H04N 21/4222 |
| 2011/0069940 A1* | 3/2011 | Shimy | G11B 27/105 |
| | | | 386/296 |
| 2014/0310742 A1 | 10/2014 | Kim | |
| 2015/0094050 A1 | 4/2015 | Bowles et al. | |

OTHER PUBLICATIONS

Office Action dated Jul. 21, 2020 in Canadian Application No. 3,047,339.
Extended European Search Report dated Jul. 10, 2020 in European Application No. 16924403.5.
Office Action dated Mar. 9, 2021 in European Patent Application No. 16 924 403.5.
Office Action dated Aug. 11, 2021 in European Patent Application No. 16 924 403.5.

* cited by examiner

METHOD AND SYSTEM TO DYNAMICALLY CONFIGURE SUBTITLES THROUGH WEARABLE DEVICES

FIELD

The present disclosure relates to the dynamic configuration of subtitles and other device settings associated with wearable computing devices, specifically the adjusting of device settings in an equipment device based on detected wearable computing devices.

BACKGROUND

Televisions, computers, radios, and other equipment that individuals may interact with as users often have customizable settings that may be set by its users. In many cases, a device may have multiple users, each of whom may have their own preferred settings that may differ from one another. For instance, a person and their significant other may have separate settings for the display of subtitles on a television, with each preferring different font faces, sizes, and colors. Traditionally, each user would have to manually adjust the settings when they are using the device, which may be an arduous and time-consuming task.

In an effort to improve the adjustment of settings, some devices provide the ability to save settings as a profile. In such instances, the users may save their preferred settings in a profile, and may select their profile when using the device to have their preferred settings loaded into the device. Such a selection is often significantly easier and faster than the manual adjustment of all of the settings. However, selecting a profile still often requires significant manual input by the user. For instance, the selection of a profile on a television can typically require the user to find a remote control, navigate on-screen menus to find a menu for selecting a profile, finding their associated profile, and selecting the profile.

Thus, there is a need for a technological solution whereby the settings on a device may be dynamically adjusted to preferred settings for a user without requiring significant manual input by the user.

SUMMARY

The present disclosure provides a description of systems and methods for dynamically configuring device settings. The methods and systems discussed herein enable an equipment device to dynamically and automatically adjust device settings based on the detection of a wearable computing device, where the settings are adjusted to a profile associated with the detected wearable computing device. In some cases, priorities or other criteria may be used to provide for resolution of potential conflicts, to ensure that device settings are adjusted as needed to the satisfaction of users, enabling the settings to be adjusted with no, or minimal, user interaction. As a result, the methods and systems discussed herein provide for a significant improvement in device accessibility and convenience over traditional equipment devices.

A method for dynamically configuring device settings includes: storing, in a memory of an equipment device, a plurality of settings profiles, wherein each settings profile is a structured data set related to a wearable computing device including at least a device identifier associated with the related wearable computing device and one or more device settings; detecting, by the equipment device, a wearable computing device, wherein detecting the wearable computing device includes identifying a specific device identifier associated with the detected wearable computing device; executing, by a querying module of the equipment device, a query on the memory to identify a specific settings profile where the included device identifier corresponds to the specific device identifier; and adjusting, in the equipment device, device settings based on the one or more device settings included in the identified specific settings profile.

An apparatus for dynamically configuring device settings includes: a memory of an equipment device configured to store a plurality of settings profiles, wherein each settings profile is a structured data set related to a wearable computing device including at least a device identifier associated with the related wearable computing device and one or more device settings; a detection module of the equipment device configured to detect a wearable computing device, wherein detecting the wearable computing device includes identifying a specific device identifier associated with the detected wearable computing device; a querying module of the equipment device configured to execute a query on the memory to identify a specific settings profile where the included device identifier corresponds to the specific device identifier; and an adjustment module of the equipment device configured to adjust device settings based on the one or more device settings included in the identified specific settings profile.

A non-transitory computer readable media has instructions operable to cause one or more processors to perform operations comprising: storing, in a memory of an equipment device, a plurality of settings profiles, wherein each settings profile is a structured data set related to a wearable computing device including at least a device identifier associated with the related wearable computing device and one or more device settings; detecting, by the equipment device, a wearable computing device, wherein detecting the wearable computing device includes identifying a specific device identifier associated with the detected wearable computing device; executing, by a querying module of the equipment device, a query on the memory to identify a specific settings profile where the included device identifier corresponds to the specific device identifier; and adjusting, in the equipment device, device settings based on the one or more device settings included in the identified specific settings profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Dynamic Configuration of Device Settings

Figure 1:
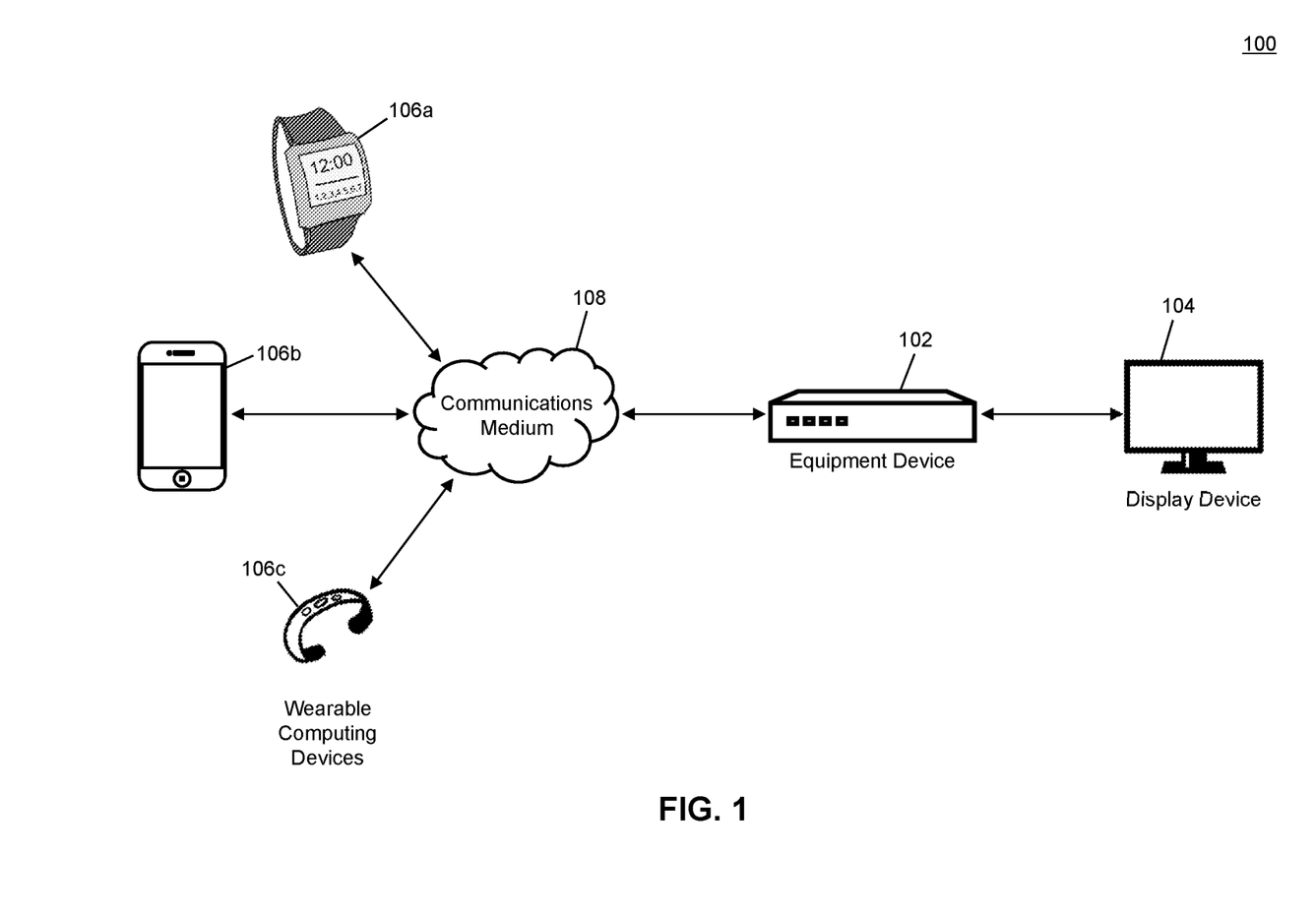
FIG. 1 is a block diagram illustrating a high level system architecture for dynamically configuring device settings in accordance with exemplary embodiments.

FIG. 1 illustrates a system 100 for the dynamic configuration of device settings of an equipment device through the detection of a wearable computing device, where the device settings of the equipment device are dynamically adjusted based on the detected wearable computing device.

The system 100 may include an equipment device 102. The equipment device 102, discussed in more detail below, may be a computing device that includes one or more device settings that may be customized by a user of the equipment device 102. For instance, the equipment device 102 may be a television, smart television, set top box, receiver, desktop computer, laptop computer, notebook computer, tablet computer, radio, video conference equipment, intercom system, etc. In some instances, the equipment device 102 may be interfaced with a display device 104 or other device that may be affected by the dynamically configured device settings of the equipment device 102. For instance, the equipment device 102 may be a set top box connected to the display device 104, where the device settings on the set top box may control or otherwise adjust the display of subtitles on the display device 104, content that is provided to the display device 104 for display, audio that is emitted by the display device 104, etc. The equipment device 102 and display device 104 may be interfaced through any suitable type of interface, such as HDMI cable, component cable, A/V (composite) cable, coaxial cable, fiber optic cable, infrared transmission, a local area network, radio frequency, Bluetooth, etc. The equipment device 102 and display device 104 may be housed within a unitary housing, such as a television set, and hard wired and/or integrated together (e.g., via a wireless protocol or other suitable interface).

The equipment device 102 may include a plurality of device settings that may be customized by a user of the equipment device 102. As discussed above, device settings may directly affect the equipment device 102, and may also affect one or more devices interfaced therewith, such as the display device 104. Device settings may include, for example, settings associated with subtitling (e.g., font face, font color, font size, location, display length, etc.), language preferences (e.g., audio language, subtitle language, caption language, etc.), audio settings (e.g., volume, bass, treble, echo, etc.), display settings (e.g., ratio, brightness, contrast, etc.), color correction and adjustment (e.g., red, green, and blue values, etc.), closed captioning (e.g., caption signal, language, display length, etc.), content selection (e.g., preferred channels, highlighted programs, filter settings, etc.), content recording (e.g., recording times, recording channels, recorded programs, data retention, etc.), device timers (e.g., sleep timers, wake timers, etc.), etc.

A user of the equipment device may adjust the device settings on the equipment device 102 and save the device settings to a settings profile. As part of the settings profile, the user may associate the settings profile with a wearable computing device 106. The wearable computing device 106 may be any type of computing device 106 that may be worn or otherwise possessed by the user that may be detected by the equipment device 102 for use in dynamically configuring the settings of the equipment device 102 as discussed herein. For instance, the wearable computing device 106 may be a smart watch (e.g., the wearable computing device 106a), cellular phone or smart phone (e.g., the wearable computing device 106b), a fitness or activity tracker (e.g., the wearable computing device 106c), implanted computing device, global positioning system receiver, or any other suitable type of wearable computing device that is typically associated a physical person as the person moves about.

The equipment device 102 may identify a device identifier associated with the wearable computing device 106 to be associated or linked to a data store for the settings profile saved for the user. The device identifier may be a unique value associated with the wearable computing device 106 used in the identification thereof, such as a media access control address, serial number, registration number, identification number, internet protocol address, telephone number, etc., or any relatively unique identifier that can be read to distinguish the presence of a person, and the presence of a person over another in a given space. In some instances, the device identifier may be manually entered into the equipment device 102 by the user, such as via an input device interfaced with the equipment device 102 (e.g., keypad or touch screen on a remote control, a display device 104, mouse, microphone, etc.). In other instances, the equipment device 102 may detect wearable computing devices 106 wirelessly or through computer readable indicia, where the user may select and/or confirm the wearable computing device 106 to associate with the settings profile.

The equipment device 102 may be configured to detect wearable computing devices 106 via one or more suitable communications mediums 108. For instance, in a first example, the communications medium 108 may be a local area network where the equipment device 102 may identify all wearable computing devices 106 connected to the same local area network. In a second example, the communications medium 108 may be Bluetooth, where the wearable computing devices 106 may be directly paired with the equipment device 102 using a suitable Bluetooth pairing method. In a third example, the communications medium may be near field communication, where the equipment device 102 may receive an electric signal transmitted by the wearable computing device 106 via associated protocols.

Once the settings profile, including the device identifier associated with a wearable computing device 106, has been saved, the equipment device 102 may dynamically adjust the device settings of the equipment device 102 when the wearable computing device 106 is detected by the equipment device 102. For instance, a first user may manually adjust the device settings of the equipment device 102 and then stop using the equipment device 102. A second user that has registered a wearable computing device 106 and settings profile may use the equipment device 102, which may detect the wearable computing device 106 and its device identifier, identify the settings profile associated with the device identifier, and dynamically adjust the device settings in accordance with the settings profile. As a result, the device settings of the equipment device 102 may be adjusted to the user's liking without requiring any interaction by the user, as the settings are automatically and dynamically adjusted based on the detection of the wearable computing device 106.

In some embodiments, the settings profile for a wearable computing device 106 may be stored locally in the equipment device 102, such as in a settings database in a memory of the equipment device 102, as discussed below. In other embodiments, settings profile data may be stored in the corresponding wearable computing device 106. For example, the user may create their profile, either via the equipment device 102 or directly on the wearable computing device 106, and the wearable computing device 106 may store the settings profile in local data storage. Then, the equipment device 102, upon detection of the wearable computing device 106, may request, retrieve, or otherwise receive the settings profile from the wearable computing device 106 as part of the detection and identification process, and then use the settings profile to modify the settings of the equipment device 102, display device 104, or other applicable device accordingly.

In some instances, the equipment device 102 may utilize a priority system for conflict resolution in instances where multiple wearable computing devices 106 may be detected. For instance, each settings profile may have a priority value associated therewith. The equipment device 102 may be activated and detect multiple wearable computing devices 106. The equipment device 102 may identify the associated settings profiles and may select one settings profile for adjustment of the device settings based on the priority values included in each one, such as by selecting the settings profile that has the highest priority.

In another example, a first user having a wearable computing device 106, such as the wearable computing device 106a, may be using the equipment device 102 with their associated settings profile. A second user having the wearable computing device 106b may enter the detection proximity of the equipment device 102 and have the wearable computing device 106b be detected. In some embodiments, if the second user's settings profile (e.g., as identified via the device identifier of the wearable computing device 105b) has a higher priority value, the equipment device 102 may adjust the device settings based thereon. In other embodiments, the equipment device 102 may be configured to not overwrite device settings. In such embodiments, the equipment device 102 may prompt a user to indicate if the device settings in the second user's settings profile should be used.

In some cases, the equipment device 102 may utilize a timeout for the adjustment of device settings. For instance, in the above example when a second user's wearable computing device 106b is detected by the equipment device 102 and has a higher priority, the equipment device 102 may wait a predetermined period of time to identify if the second user is staying in the area (e.g., their wearable computing device 106b continues to be detected by the equipment device 102) before adjusting the device settings. Such a timeout may ensure that the device settings are not adjusted for a user who is simply passing by and not actively engaging with the equipment device 102. Similarly, when a user whose setting profile is being used leaves the detection proximity of the equipment device 102 (e.g., their wearable computing device 106 is no longer detected), the equipment device 102 may wait a predetermined period of time before adjusting to a new settings profile (e.g., to default settings, to a settings profile of another detected wearable computing device 106, etc.). Such a timeout may ensure that the device settings are not reverted away from an individual's preferred settings if the individual is returning to the equipment device 102, such as after a trip to the restroom or refrigerator. In such embodiments, the predetermined periods of time to be used as timeouts may be configured by the users of the equipment device 102. In some cases, the timeout periods of time may be included in the device settings that may be adjusted via settings profiles.

In some embodiments, the equipment device 102 may be configured to perform conflict resolution of competing settings profiles based on distance. For instance, the equipment device 102 may determine the distance of wearable computing devices 106 to the equipment device 102 based on signal strength of the detection of the wearable computing devices 106, and may select the settings profile for the closest wearable computing device 106 (e.g., that has a higher signal strength). In some instances, the equipment device 102 may use a secondary device for detection and/or selection. For example, the equipment device 102 may be interfaced with a remote control for operation thereof. In such an example, the remote control may be configured to detect wearable computing devices 106 and may provide data associated therewith (e.g., device identifiers, signal strength, distance estimations, etc.) to the equipment device 102 for use in performing the functions discussed herein. For instance, the equipment device 102 may select the settings profile for a wearable computing device 106 located closest to the remote control (e.g., based on signal strength), such that the device settings are those preferred by the user controlling the remote.

Methods and systems discussed herein thus enable a user of equipment device 102 to have customized device settings associated therewith that are automatically and dynamically enabled when in proximity of the equipment device 102, without requiring any user interaction with the equipment device 102. As a result, users may have their preferred settings automatically loaded into the equipment device 102 during use without having to manually adjust settings or manually select profiles, as in traditional systems. Thus, the technical solution provided by the equipment device 102 as discussed herein may provide greater user convenience and accessibility with regard to customized device settings.

Equipment Device

Figure 2:
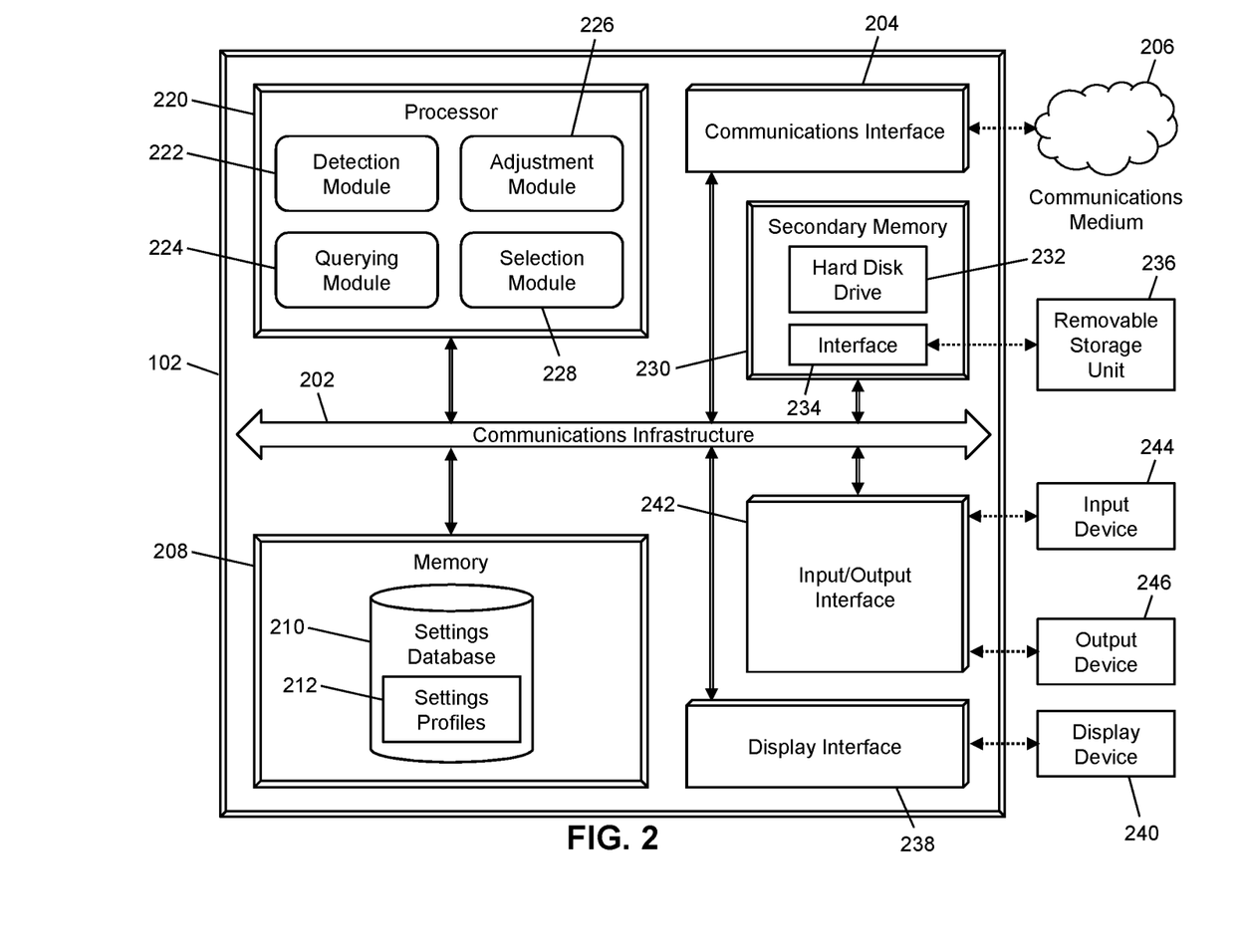
FIG. 2 is a block diagram illustrating the equipment device of the system of FIG. 1 for the dynamic configuration of device settings through wearable computing devices in accordance with exemplary embodiments.

FIG. 2 illustrates an embodiment of the equipment device 102 in the system 100. It will be apparent to persons having skill in the relevant art that the embodiment of the equipment device 102 illustrated in FIG. 2 is provided as illustration only and may not be exhaustive to all possible configurations of the equipment device 102 suitable for performing the functions as discussed herein.

The equipment device 102 may include a communications infrastructure 202. The communications infrastructure 202 may be configured to transmit data between modules, engines, databases, memories, and other components of the equipment device 102 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the equipment device 102 and external components of the equipment device 102, such as externally connected databases, display devices, input devices, etc.

The equipment device 102 may also include a communications interface 204. The communications interface 204 may include one or more interfaces used to interact with and facilitate communications between the equipment device 102 and one or more external devices via suitable communications mediums 206. For instance, the communications interface 204 may interface with the communications infrastructure 202 and provide an interface 204 for connecting the equipment device 102 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the equipment device 102 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein.

The communications interface 204 may be configured to receive data signals electronically transmitted by wearable computing devices 106, which may be superimposed or otherwise encoded with device identifiers. In some instances, the communications interface 204 may receive data signals superimposed with device identifiers from other computing devices, such as remote control that is interfaced with the equipment device 102 via the communications interface 204. The communications interface 204 may also be configured to electronically transmit data signals to wearable computing devices 106, such as for the detection thereof and/or the requesting of data therefrom. In some instances, the communications interface 204 may be configured to electronically transmit data signals to and receive data signals from a display device 104 or other device interfaced therewith, such as to convey device settings, receive device settings, manage operations, etc.

The equipment device 102 may also include a memory 208. The memory 208 may be configured to store data for use by the equipment device 102 in perform the functions discussed herein. The memory 208 may be comprised of one or more types of memory using one or more suitable types of memory storage, such as random access memory, read-only memory, hard disk drives, solid state drives, magnetic tape storage, etc. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the equipment device 102 may include a settings database 210. The settings database 210 may be configured to store a plurality of settings profile 212 using a suitable storage format and schema. Each settings profile 212 may be a structured data set configured to store data related to device settings for the equipment device 102 and/or one or more interfaced devices (e.g., display devices 104). Each settings profile 212 may include at least a device identifier associated with a wearable computing device 106 and one or more device settings. In some instances, a settings profile 212 may also include a priority value and/or one or more periods of time to use as a timeout for adoption to or reversion from the settings profile 212. The memory 208 may also be configured to store one or more device settings associated with the equipment device 102 and/or the display device 104 or other devices interfaced with the equipment device 102.

The equipment device 102 may also include a processor 220. The processor 220 may be configured to perform the functions of the equipment device 102 discussed herein as will be apparent to persons having skill in the relevant art. In some embodiments, the processor 220 may include and/or be comprised of a plurality of engines and/or modules specially configured to perform one or more functions of the processing device, such as a querying module 224, detection module 222, adjustment module 226, selection module 228, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the equipment device 102 may include a querying module 224. The querying module 224 may be configured to execute queries on databases to identify information. The querying module 224 may receive one or more data values or query strings, and may execute a query string based thereon on an indicated database, such as the settings database 210, to identify information stored therein. The querying module 224 may then output the identified information to an appropriate engine or module of the equipment device 102 as necessary. The querying module 224 may, for example, execute a query on the settings database 210 to identify a settings profile 212 that is related to a detected wearable computing device 106 based on the device identifier associated therewith.

The processor 220 of the equipment device 102 may also include a detection module 222. The detection module 222 may be configured to detect a wearable computing device 106 using a suitable method associated therewith. Detection of a wearable computing device 106 may be performed via a communications interface 204 and associated communications medium 206, which may also be dependent on the wearable computing device 106. For instance, the detection module 222 may be configured to detect some wearable computing devices 106 via near field communication and others via a local area network, depending on applicability. Detection of wearable computing devices 106 may include the identification of a device identifier associated therewith, which may be parsed from a data signal received (e.g., by the communications interface 204 and conveyed via the communications infrastructure 202) from the wearable computing device 106. In some embodiments, the detection module 222 may also be configured to detect the distance of a wearable computing device 106 from the equipment device 102 (e.g., or other associated computing device, such as a remote control) using any suitable method, such as triangulation, signal strength, etc.

The processor 220 of the equipment device 102 may further include an adjustment module 226. The adjustment module 226 may be configured to adjust device settings for the equipment device 102 and/or other interfaced computing devices, such as may be stored in the memory 208 of the equipment device 102. The adjustment module 226 may be configured to adjust device settings based on the device settings stored in a settings profile 208 stored in the settings database 210. For instance, the detection module 222 may detect a wearable computing device 106 and device identifier associated therewith, which may be used by the querying module 220 to identify a settings profile 212. The adjustment module 226 may then adjust the device settings of the equipment device 102 (e.g., and/or other devices, as applicable) based on the one or more device settings stored in the identified settings profile 212.

In some embodiments, the processor 220 of the equipment device 102 may also include a selection module 228. The selection module 228 may be configured to perform functions of the equipment device 102 related to conflict resolution of multiple settings profiles 212 for selection thereof for dynamic adjustment of device settings. The selection module 228 may be configured to select when the device settings of a settings profile 212 should be implemented (e.g., by the adjustment module 226). In some instances, the selection module 228 may select a settings profile 212 for adjusting of the device settings based on priority values. In other instances, the selection module 228 may be configured to select a settings profile 212 based on signal strength or distance from the equipment device 102 or interfaced computing device. In some embodiments, the selection module 228 may be configured to select settings profiles 212 for adoption or reversion based on periods of time, such as timeout periods that may be based on when a wearable computing device 106 is detected or is no longer detected by the detection module 222.

In some embodiments, the equipment device 102 may also include a secondary memory 230. The secondary memory 230 may be another memory in addition to the memory 208 that may be used to store additional data for use in performing the functions of the equipment device 102 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc. In some cases, the equipment device 102 may also, or alternatively, be configured to store data external to the equipment device 102, such as in a remotely accessible data storage medium, such as may be interfaced with the equipment device 102 by the communications interface 204 using one or more suitable communications mediums 206. For example, the equipment device 102 may use cloud computing techniques to store the data used to perform the functions discussed herein remotely.

In some cases, the equipment device 102 may also include a display interface 238. The display interface may be configured to interface the equipment device 102 with one or more display devices 240. The display devices 240 may be devices configure to display data received from the equipment device 102. Display devices 240 may be any suitable type of display, including, for example, liquid crystal displays, light emitting diode displays, thin film transistor display, capacitive touch displays, etc. In some instances, the equipment device 102 may include one or more display interfaces 238, which may interface with one or more display devices 240. Display devices 240 may, for example, display menus for the selection of device settings for saving in a settings profile 212 for future adjustment of device settings based on detection of a wearable computing device 106.

The equipment device 102 may also include an input/output interface 242. The input/output interface 242 may be configured to interface the equipment device 102 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to an equipment device 102, such as a keyboard, mouse, microphone, camera, touch screen, click wheel, scroll wheel, remote control, etc. Input devices 244 may be configured to receive input from a user of the equipment device 102, such as for the changing of device settings, input of a device identifier, etc. Output devices 246 may include any suitable type of device for outputting data from an equipment device 102, such as a speaker, remote control, headset, tactile feedback device, etc.

Process for Dynamic Adjustment of Device Settings

Figure 3:
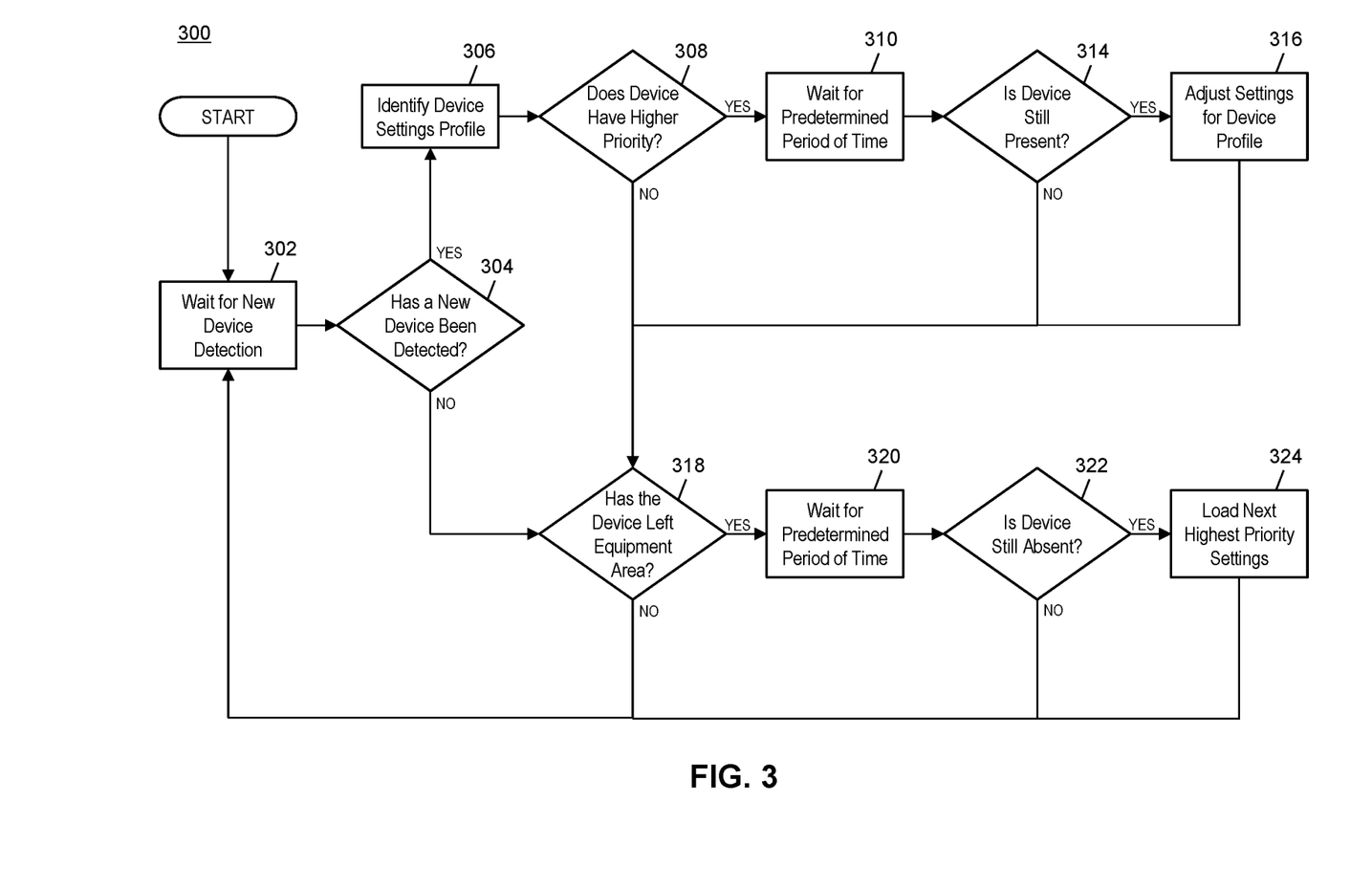
FIG. 3 is a flow diagram illustrating a process for dynamically configuring device settings using the equipment device of FIG. 2 in accordance with exemplary embodiments.

FIG. 3 illustrates a process 300 for the dynamic adjustment of device settings in the equipment device 102 based on detection of a wearable computing device 106.

In step 302, the equipment device 102 may continue its present operation and wait for the detection module 222 of the processor 220 to detect a new wearable computing device 106. In some instances, the equipment device 102 may be operating using default device settings. In other instances, the equipment device 102 may be operating with device settings associated with a previously identified wearable computing device 102. In step 304, the processor 220 may determine, such as based on the detection module 222, if a new wearable computing device 106 is detected. The determination may be based on data signals received by the equipment device using the communications interface 204 via the associated communications medium(s) 206. If a new wearable computing device 106 is not detected, then the process 300 may proceed to step 318, discussed in more detail below.

If a new wearable computing device 106 is detected, the detection module 222 may detect its device identifier using a suitable method as discussed herein, and, in step 306, the querying module 224 of the processor 220 may execute a query on the settings database 210 in the memory 208 to identify a settings profile 212 associated with the detected device identifier. In step 308, the selection module 228 of the processor 220 may determine if the newly detected wearable computing device 106 has a higher priority value than any wearable computing device 106 whose device settings are already being used. If the new wearable computing device 106 has a lower priority, no action may be performed and the process 300 may proceed to step 318, discussed in more detail below. If the new wearable computing device 106 has a higher priority, or if there was no prior wearable computing device 106, then, in step 310, the processor 220 may wait for a predetermined period of time prior to adopting new device settings. Such a period of time may ensure that the device settings are not accidentally adjusted, such as due to an incorrect detection or the wearable computing device 106 passing through the area.

In step 314, the detection module 222 may determine if the new wearable computing device 106 is still being detected. If the wearable computing device 106 is still detected (e.g., is still in proximity of the equipment device 102), then, in step 316, the adjustment module 226 of the processor 220 may adjust the device settings of the equipment device (e.g., as stored in the memory 208) based on the one or more device settings included in the settings profile 212 associated with the new wearable computing device 106. Following the adjustment, or if the new wearable computing device 106 was not determined to be present in step 314, the equipment device 104 may continue to operate and, in step 318, the detection module 222 may determine if the wearable computing device 106 whose device settings are being used has left the area of the equipment device 102 (e.g., is no longer detected). If the wearable computing device 106 has not left, then the process 300 may return to step 302 and wait for a new detection.

If the wearable computing device 106 has left the area, then, in step 320, the processor 220 may wait a predetermined period of time. Such a period of time may be used to ensure that the wearable computing device 106 will not be returning to the area, such as to not cause a change in settings for a trip to the restroom or for refreshments. In some instances, the predetermined period of time waited for in step 320 may be the same predetermined period of time used in step 310. In step 322, the detection module 222 may determine if the current wearable computing device 106 is still absent from the area (e.g., is not being detected by the detection module 222). If the wearable computing device 106 is not still absent (e.g., has returned to the area), then the process 300 may return to step 302 and no actions performed. On the other hand, if the wearable computing device 106 is determined to still be absent, then, in step 324, the adjustment module 226 may load the device settings for the new highest priority wearable computing device 106 still detected by the detection module 222. If there are no other wearable computing devices 106 detected, then, in some instances, the adjustment module 226 may adjust the device settings to default settings. In other instances, the device settings of the wearable computing device 106 most recently in the area may continue to be used until adjusted to the device settings of a newly detected wearable computing device 106.

Exemplary Method for Dynamically Configuring Device Settings

Figure 4:
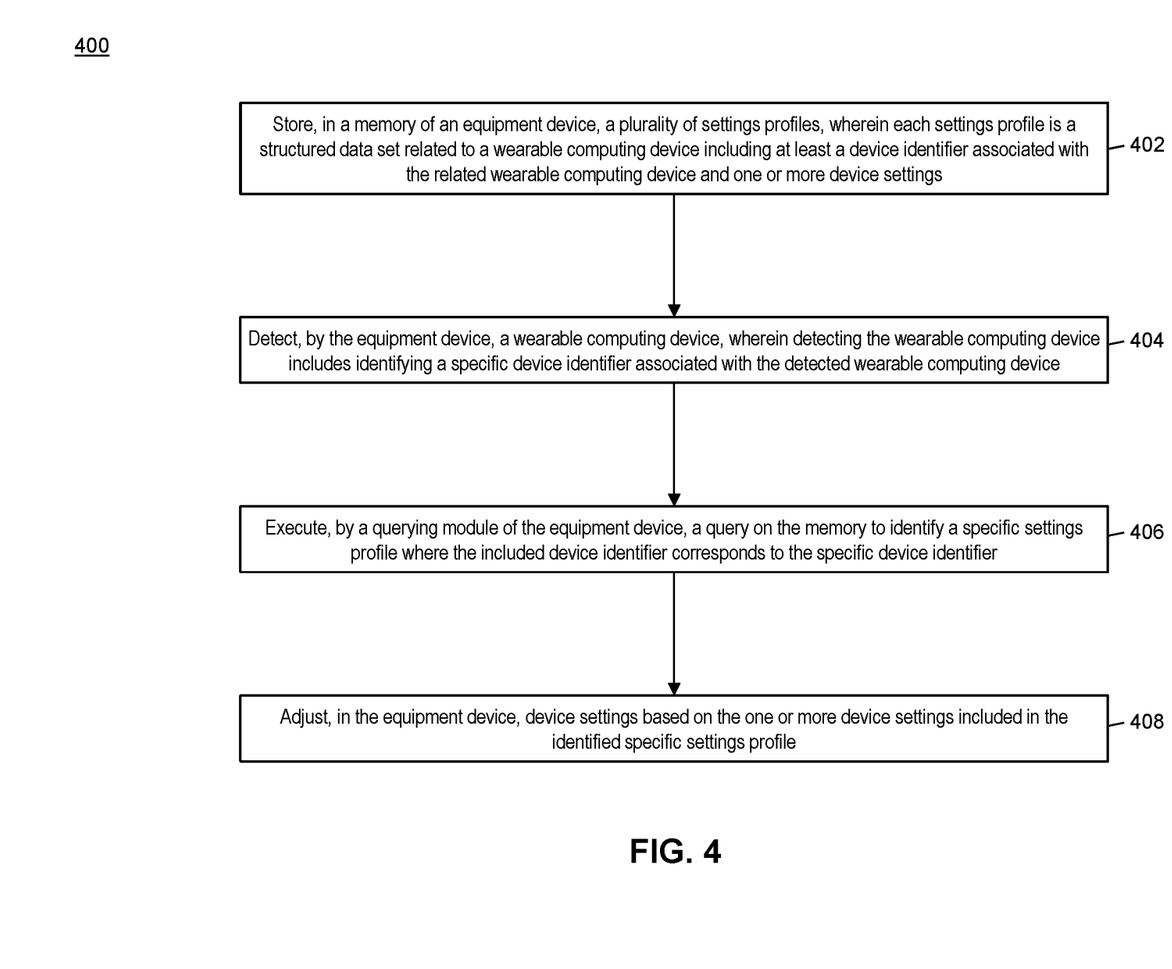
FIG. 4 is a flow chart illustrating an exemplary method for dynamically configuring device settings in accordance with exemplary embodiments.

FIG. 4 illustrates a method 400 for the dynamic configuration of device settings for an equipment device (e.g., the equipment device 102) based on device settings associated with a detected wearable computing device (e.g., wearable computing device 106).

In step 402, a plurality of settings profiles (e.g., settings profiles 212) may be stored in a memory (e.g., the settings database 210 of the memory 208) of an equipment device, wherein each settings profile is a structured data set related to a wearable computing device including at least a device identifier associated with the related wearable computing device and one or more device settings. In step 404, a wearable computing device may be detected by the equipment device (e.g., via the detection module 222 of the processor 220), wherein detecting the wearable computing device includes identifying a specific device identifier associated with the detected wearable computing device In step 406, a query may be executed on the memory by a querying module (e.g., the querying module 224 of the processor 220) of the equipment device to identify a specific settings profile where the included device identifier corresponds to the specific device identifier. In step 408, device settings in the equipment device may be adjusted (e.g., via the adjustment module 226 of the processor 220) based on the one or more device settings included in the identified specific settings profile.

In one embodiment, the method 400 may further include detecting, by the equipment device, a second wearable computing device, wherein detecting the second wearable computing device includes identifying a second device identifier associated with the second wearable computing device; and executing, by the querying module of the equipment device, a query on the memory to identify a second settings profile where the included device identifier corresponds to the second device identifier. In a further embodiment, the method 400 may even further include overwriting, by the equipment device, the adjusted device settings based on the one or more device settings included in the identified second settings profile. In an even further embodiment, each settings profile may further include a priority rank, and overwriting the adjusted device settings may not be performed if the priority rank included in the second settings profile is below the priority rank included in the specific settings profile. In another even further embodiment, overwriting of the adjusted device settings may be performed after a predetermined period of time if the second wearable computing device is still detected by the equipment device.

In some embodiments, the wearable computing device may be detected based on a data signal received via one of: a local area network, a wireless area network, Bluetooth, radio frequency, and near field communication. In one embodiment, the one or more device settings may include a setting associated with at least one of: subtitling, language preferences, audio settings, display settings, color correction, color adjustment, closed captioning, content selection, content recording, and device timers.

Techniques consistent with the present disclosure provide, among other features, systems and methods for dynamically configuring device settings through wearable computing devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for dynamically configuring device settings, comprising:
   storing, in a memory of an equipment device, a plurality of settings profiles, wherein each settings profile is a structured data set related to a wearable computing device including at least a device identifier associated with the related wearable computing device, one or more device settings, and a priority rank of the wearable computing device, wherein the one or more device settings affect the equipment device and at least one other device interfaced with the equipment device;

detecting, by the equipment device, a first wearable computing device, wherein detecting the first wearable computing device includes identifying a first device identifier, which is a device identifier associated with the detected first wearable computing device that distinguishes a presence of a first person over another;

executing, by the equipment device, a query on the memory to identify a first settings profile of the plurality of settings profiles associated with the first device identifier;

adjusting, in the equipment device, the one or more device settings of the equipment device based on one or more first device settings included in the identified first settings profile in the memory;

detecting, by the equipment device, a second wearable computing device, wherein detecting the second wearable computing device includes identifying a second device identifier associated with the second wearable computing device that distinguishes a presence of a second person over another person;

executing, by the equipment device, a query on the memory to identify a second settings profile, which is a profile stored in the memory in association with the second device identifier;

determining, by the equipment device, distances of the first and second wearable computing devices from a remote control of the equipment device, wherein the priority ranks of the first and second wearable devices are based on the distances;

determining, by the equipment device, whether the priority rank of the second wearable computing device is higher than the priority of the first wearable computing device; and overwriting, in the equipment device, the adjusted device settings based on the determination and one or more second device settings identified in the second settings profile in the memory.

2. The method of claim 1, further comprising:
when either of the first or second wearable computing device is no longer detected, retaining or reverting, by the equipment device, the adjusted device settings so as to implement the one or more device settings included in the settings profile associated with a highest ranking remaining detected wearable computing device.

3. The method of claim 1, further comprising:
when neither of the first and second wearable computing devices is still detected, reverting, by the equipment device, the adjusted device settings to predetermined default settings.

4. The method of claim 1, wherein the overwriting of the adjusted device settings is performed after a predetermined period of time if the second wearable computing device is still detected by the equipment device.

5. The method of claim 1, wherein at least one of the first and second wearable computing devices is detected based on a data signal received via one of: a local area network, a wireless area network, Bluetooth, radio frequency, and near field communication.

6. The method of claim 1, wherein the one or more device settings includes a setting associated with at least one of: subtitling, language preferences, audio settings, display settings, color correction, color adjustment, closed captioning, content selection, content recording, and device timers.

7. An apparatus for dynamically configuring device settings, comprising:
a memory configured to store program code and a plurality of settings profiles, wherein each settings profile is a structured data set related to a wearable computing device including at least a device identifier associated with the related wearable computing device, one or more device settings, and a priority rank of the wearable computing device, wherein the one or more device settings affect the equipment device and at least one other device interfaced with the equipment device;

a processor configured to execute the program code stored on the memory so as to:

detect a first wearable computing device, wherein detecting the first wearable computing device includes identifying a device identifier, as a first device identifier, associated with the detected first wearable computing device that distinguishes a presence of a first person over another;

query the memory to identify a first settings profile of the plurality of setting profiles with the first device identifier;

adjust the one or more device settings of the equipment device based on one or more first device settings included in the identified first settings profile in the memory;

detect a second wearable computing device, wherein detecting the second wearable computing device includes identifying a second device identifier associated with the second wearable computing device that distinguishes a presence of a second person over another person;

query the memory to identify a second settings profile, which is a profile stored in the memory in association with the second device identifier;

determine, by the equipment device, distances of the first and second wearable computing devices from a remote control of the equipment device, wherein the priority ranks of the first and second wearable devices are based on the distances;

determine whether the priority rank of the second wearable computing device is higher than the priority rank of the first wearable computing device; and overwriting the adjusted device settings based on the determination and one or more second device settings identified in the second settings profile in the memory.

8. The apparatus of claim 7, wherein the overwriting of the adjusted device settings is performed after a predetermined period of time if the second wearable computing device is still detected by the equipment device.

9. The apparatus of claim 7, wherein at least one of the first and second wearable computing devices is detected based on a data signal received via one of: a local area network, a wireless area network, Bluetooth, radio frequency, and near field communication.

10. The apparatus of claim 7, wherein the one or more device settings includes a setting associated with at least one of: subtitling, language preferences, audio settings, display settings, color correction, color adjustment, closed captioning, content selection, content recording, and device timers.

11. The apparatus of claim 7, wherein the processor is further configured to, when either of the first or second wearable computing device is no longer detected, retaining or reverting the adjusted device settings so as to implement the one or more device settings included in the settings profile associated with a highest ranking remaining detected wearable computing device.

12. The apparatus of claim 7, wherein the processor is further configured to, when neither of the first and second wearable computing devices is still detected, revert the adjusted device settings to predetermined default settings.

13. A non-transitory computer readable media having instructions operable to cause one or more processors to perform the operations comprising:
- storing, in a memory of an equipment device, a plurality of settings profiles, wherein each settings profile is a structured data set related to a wearable computing device including at least a device identifier associated with the related wearable computing device, one or more device settings, and a priority rank of the wearable computing device, wherein the one or more device settings affect the equipment device and at least one other device interfaced with the equipment device;
- detecting, by the equipment device, a first wearable computing device, wherein detecting the first wearable computing device includes identifying a device identifier, as a first device identifier, associated with the detected first wearable computing device that distinguishes a presence of a first person over another;
- executing, by the equipment device, a query on the memory to identify a first settings profile of the plurality of settings profiles associated with the first device identifier;
- adjusting, in the equipment device, the one or more device settings of the equipment device based on one or more first device settings included in the identified first settings profile in the memory;
- detecting, by the equipment device, a second wearable computing device, wherein detecting the second wearable computing device includes identifying a second device identifier associated with the second wearable computing device that distinguishes a presence of a second person over another;
- executing, by the equipment device, a query on the memory to identify a second settings profile, which is a profile stored in the memory in association with the second device identifier;
- determining, by the equipment device, distances of the first and second wearable computing devices from a remote control of the equipment device, wherein the priority ranks of the first and second wearable devices are based on the distances;
- determining, by the equipment device, whether the priority rank of the second wearable computing device is higher than the priority rank of the first wearable computing device; and
- overwriting, in the equipment device, the adjusted device settings based on the determination and one or more second device settings identified in the second settings profile in the memory.

14. The non-transitory computer readable media of claim 13, wherein the overwriting of the adjusted device settings is performed after a predetermined period of time if the second wearable computing device is still detected by the equipment device.

15. The non-transitory computer readable media of claim 13, wherein at least one of the first and second wearable computing devices is detected based on a data signal received via one of: a local area network, a wireless area network, Bluetooth, radio frequency, and near field communication.

16. The non-transitory computer readable media of claim 13, further having instructions operable to cause one or more processors to perform the operations comprising:
- when either of the first or second wearable computing device is no longer detected, retaining or reverting, by the equipment device, the adjusted device settings so as to implement the one or more device settings included in the settings profile associated with a highest ranking remaining detected wearable computing device.

17. The non-transitory computer readable media of claim 13, further having instructions operable to cause one or more processors to perform the operations comprising:
- when neither of the first and second wearable computing devices is still detected, reverting, by the equipment device, the adjusted device settings to predetermined default settings.

* * * * *